(No Model.)

S. GOLDNER.
COMB GAGE ATTACHMENT FOR SCISSORS OR SHEARS.

No. 595,470. Patented Dec. 14, 1897.

WITNESSES:
William H. Mack
Ignatz Fried

INVENTOR
Simon Goldner,
BY Thomas F. Raynor,
ATTORNEY.

UNITED STATES PATENT OFFICE.

SIMON GOLDNER, OF NEW YORK, N. Y.

COMB-GAGE ATTACHMENT FOR SCISSORS OR SHEARS.

SPECIFICATION forming part of Letters Patent No. 595,470, dated December 14, 1897.

Application filed February 26, 1897. Serial No. 625,229. (No model.)

*To all whom it may concern:*

Be it known that I, SIMON GOLDNER, a subject of the King of Roumania, and a resident of New York, in the county of New York and State of New York, have invented certain new and useful Improvements in Comb-Gage Attachments for Scissors or Shears, of which the following is a specification.

This invention relates to attachments for scissors, shears, or like instruments, and has for its object such a combination of a gage attachment of a comb-like construction with a scissors that by means thereof the length of the clip of the scissors may be regulated automatically whenever the scissors or like device is used to cut hair, wool, fur, or similar substances; and the invention consists in combining with the blades of the instrument a pair of gages, each of which is provided with teeth like a comb and of a length corresponding with the length of the hair that remains uncut whenever the device is used, and the teeth of each gage being sloped toward the other, so that the hair will be drawn in a vertical position with reference to the cutting edges of the scissors, and being so arranged upon the blades of the latter that they will pass together without those of one blade interfering with those upon the opposite blade when the edges of the scissors are brought together, and also so that the hair remaining uncut will not be caught or bound in any way between the teeth of the two sections of the gages when the blades of the scissors are closed, and but for which provision the scissors could not be readily removed from the hair when the blades were closed and the whole device was being used.

The nature and objects of my invention will be more fully understood by reference to the accompanying drawings, which form a part of this specification, and in which similar letters refer to similar parts throughout the several views, and from what is described more fully hereinafter, and as will be more particularly pointed out in the claim.

Figure 1:
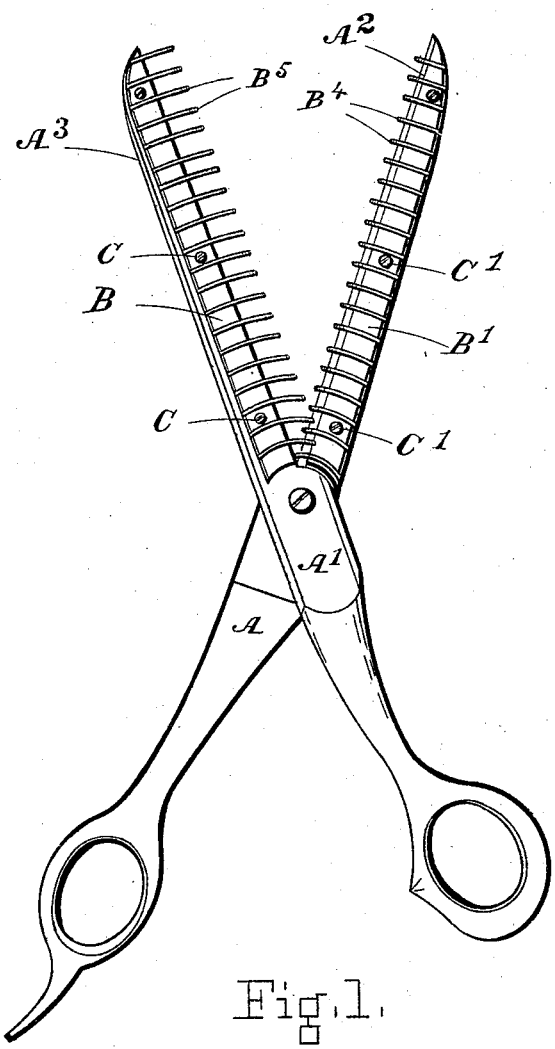
Figure 2:
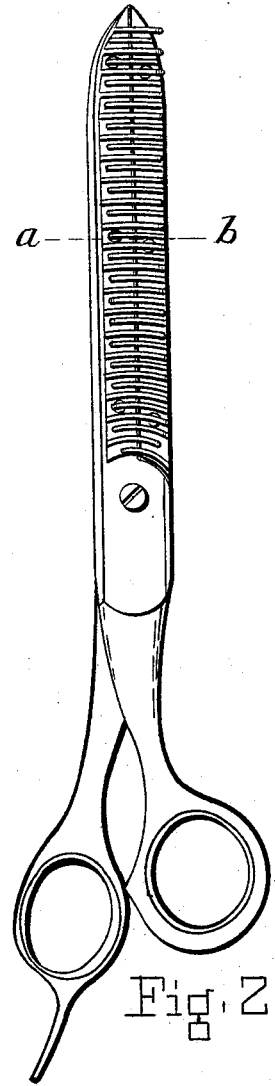
Figure 3:
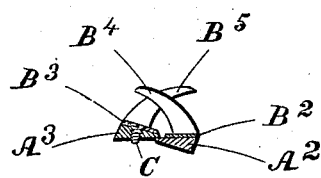

In the drawings, Figure 1 represents a front elevation of a pair of shears, the blades of which are open, and upon each of which a comb-gage is shown as being secured in proper relations therewith, and being so secured thereto by means of screws that the gages may be detachable from the blades of the shears when desired. Fig. 2 represents the shears as provided with my improvement, and, as in Fig. 1, only the blades being shown in the closed position, so that the relative positions of the two gage-sections may be seen and understood when the blades of the shears are in the closed position. Fig. 3 represents a section on the line $a\ b$ in Fig. 2 and shows the angular slope toward each other of the gage-teeth, as well as their relative length and arrangement together when the blades of the shears are in the closed position.

In the drawings, A and A' represent the sections of a pair of scissors or shears, upon the blade portions $A^2\ A^3$ of which a pair of gage-combs B B' are secured by means of the screws C C and C' C', which pass through the spines or bases $B^2\ B^3$ thereof and through the blades $A^2\ A^3$ of the shears, thereby securing the combs and the blades together. The teeth $B^4$ of the comb B' are so arranged upon the blade $A^2$ as to pass between corresponding teeth $B^5$ of the comb B whenever the blades of the shears are in the closed position, as indicated in Fig. 2, the comb B being arranged and secured to the blade $A^3$ to admit of this. The teeth of each comb-section are far enough apart to allow the teeth of the other comb-section to pass between them and without touching each other in any way, so that there is no liability of the hair becoming gripped by the frictional contact of the teeth of one of the comb-sections with those of the other during the operation of hair-clipping when the device is being used.

The sloping angle of the teeth upon each of the sections toward those of the other causes the device to gather the hair in such a manner as to hold it in a vertical position with reference to the cutting edges of the blades, and thereby enables a person to cut the hair of a uniform length and corresponding to the distance between the plane of the cutting edges of the blades and that in which the ends of the teeth of the two comb-sections move.

In operating this device the combs are held toward the hair, and if used, for instance, in cutting a person's hair the ends of the combs will rest against the scalp and slide upon its surface, while drawing the hair that is between the blades toward their cutting edges, and when the latter come together the hair becomes clipped at a length corresponding to the distance between the edges of the blades and the plane in which the ends of the combs move, and which is, of course, the surface of the scalp itself. To get different lengths of the clip, the combs should have their teeth of a length corresponding to the length of the clip desired.

The combs are shown as being secured to the blades by screws; but it is to be understood that they could be riveted or soldered with the blades, if preferred. The combs could also have, by a modification of their construction, any convenient clamping device that would be suitable to make them more easily detachable from the blades, if such a feature was found desirable.

The combs answer the purpose of combing the hair as well as gaging the length of the clip, and a shears provided with them can be manipulated as a comb by a hair-cutter and without necessitating the use of a comb otherwise and as is ordinarily required in hair-cutting.

The combs can be made of any kind of metal or other suitable material.

It can thus be seen that I provide a simple and inexpensive device for the purposes intended, and one that meets the requirements of such an instrument in every way, and, furthermore, that by its use a person that is not skilled in the art of hair-cutting can nevertheless with the aid of this device perform an operation of this character satisfactorily, as the principal difficulty in hair-cutting is to keep the hair in a vertical position with reference to the scalp while being trimmed, and which effect is attained automatically by the use of this invention.

Having thus described my invention, what I claim, and desire to secure by Letters Patent, is—

The combination with a scissors or like device, of a pair of combs secured to its blades, the teeth of which are set at sloping angles and toward each other and from each of the blades, and adapted to draw the hair, or other substance being clipped, into a vertical position between the cutting edges of the blades, substantially as specified.

Signed at New York, in the county of New York and State of New York, this 17th day of February, A. D. 1897.

SIMON GOLDNER.

Witnesses:
WILLIAM H. MACK,
IGNATZ FRIED.